Sept. 20, 1960 K. SOMMER 2,953,101
ROPE TROLLEY FOR CABLEWAYS, CABLE CRANES AND THE LIKE
Filed March 2, 1954 6 Sheets-Sheet 3
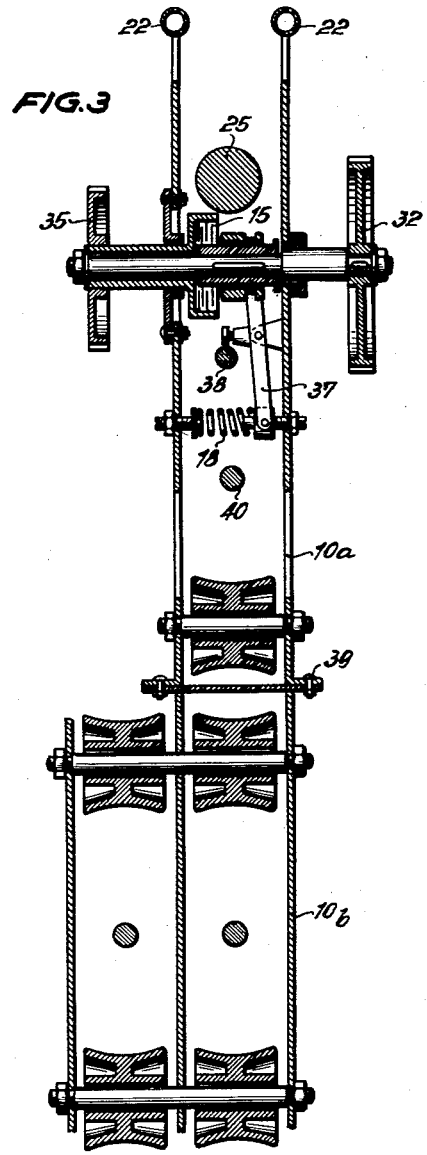
INVENTOR
Karl Sommer
By
Patent Agent

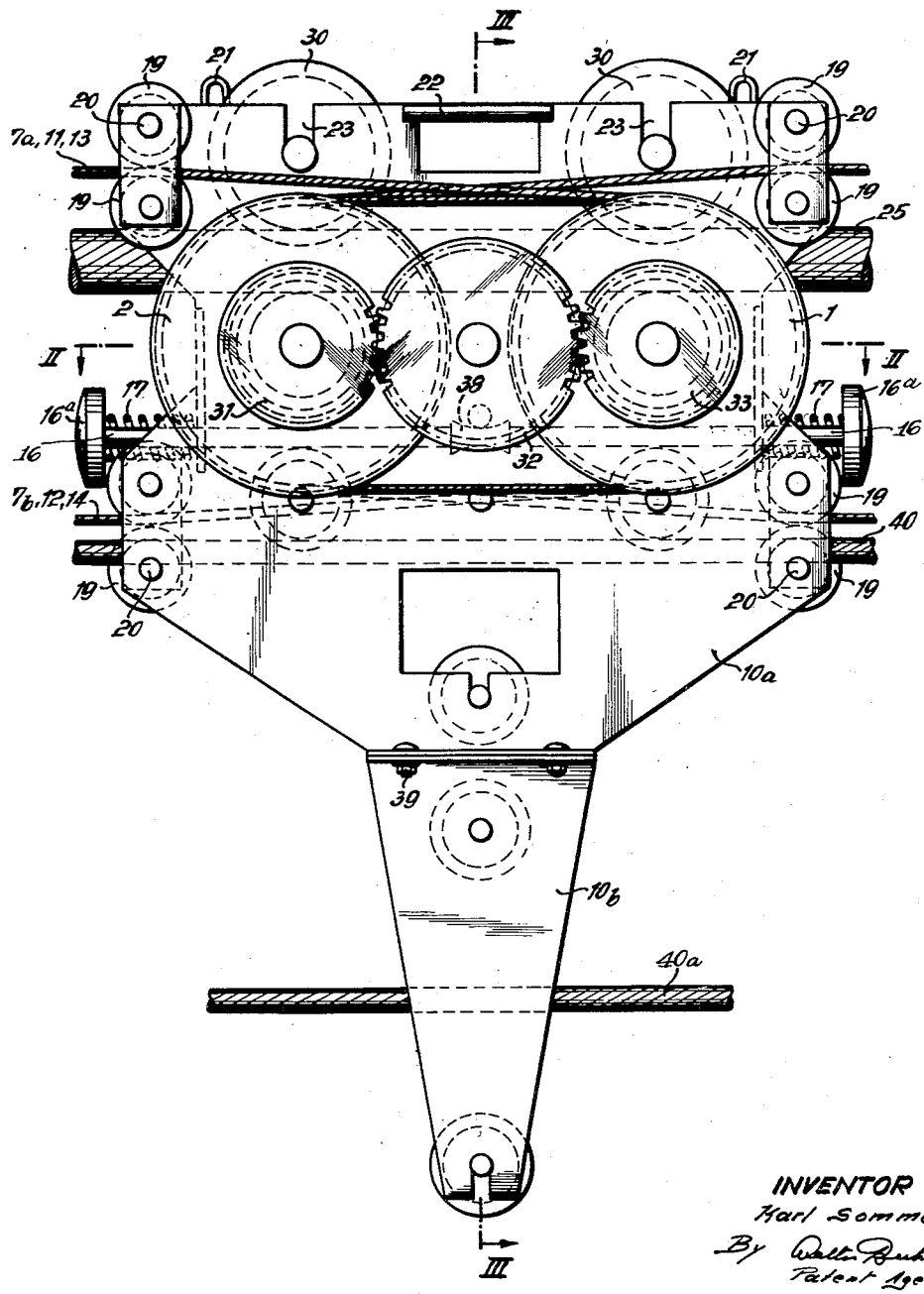

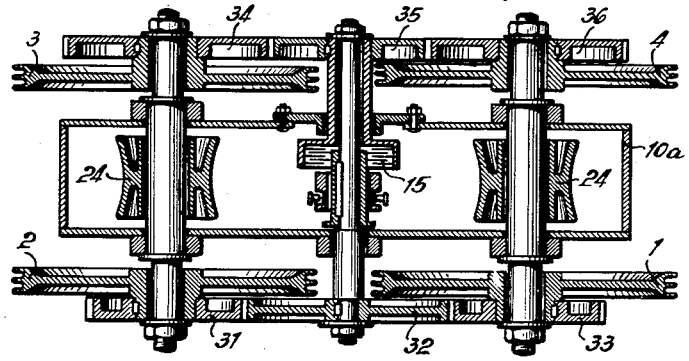
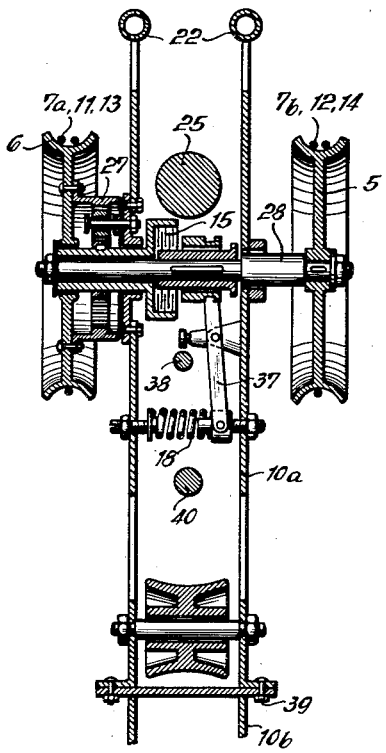
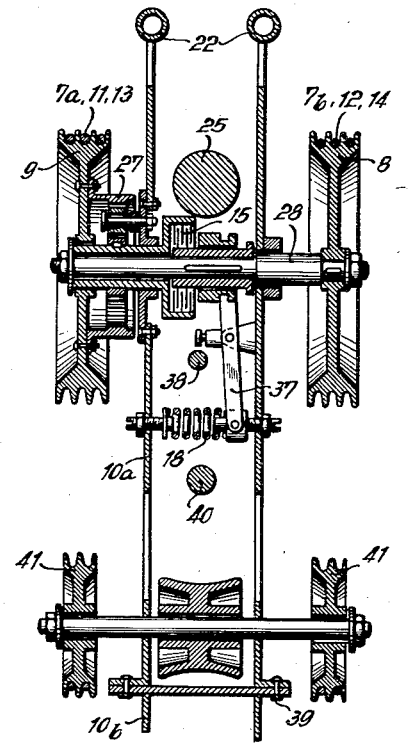

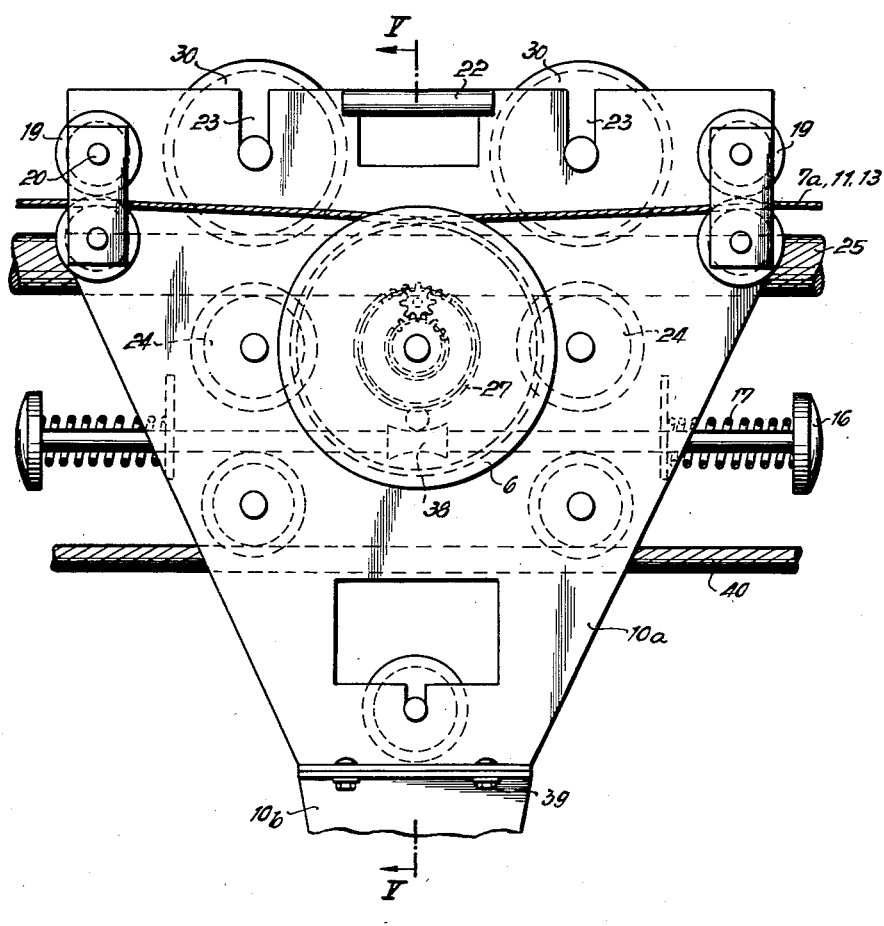

United States Patent Office 2,953,101
Patented Sept. 20, 1960

2,953,101

ROPE TROLLEY FOR CABLEWAYS, CABLE CRANES AND THE LIKE

Karl Sommer, Koln-Zollstock, Germany, assignor to J. Pohlig Aktiengesellschaft, Koln-Zollstock, Germany Filed Mar. 2, 1954, Ser. No. 413,599

Claims priority, application Germany Mar. 16, 1953

19 Claims. (Cl. 104—173)

The present invention relates to rope trolleys, and to cableways, cable cranes and the like equipped with such rope trolleys.

The heretofore known rope trolleys which serve for supporting the traction ropes, hoisting ropes, dumping ropes or the like of cable cranes, cableways or the like have various drawbacks. Thus, when rope trolleys in form of horn trolleys are used the picking up and depositing of the horn trolleys cause considerable shocks so that the button ropes, trolleys and carriages are easily damaged. Also when folding trolleys are employed considerable shock is encountered when these trolleys meet the carriage so that the ropes frequently jump out of the supporting rollers or the trolleys occupy an oblique position. Therefore these trolleys as well as the horn trolleys require that the speed of the carriage be rather low. Also the so-called follower trolleys as heretofore known can be safely employed only at relatively low speeds of the carriage.

It is, therefore, an object of the present invention to provide a trolley arrangement which will overcome the above mentioned drawbacks.

It is another object of this invention to provide an arrangement of the type referred to above which will make it possible that the trolleys will move simultaneously with the carriage so that with each position of the carriage the distance between the carriage and the starting point on the support is sub-divided into even sections by the trolleys.

It is a further object of this invention to provide an arrangement of the type set forth in the preceding paragraph in which the speed of the individual trolleys will remain substantially the same for one and the same speed of the carriage, i.e. as long as the speed of the carriage remains the same.

It is a still further object of this invention to provide an arrangement as set forth in the two preceding paragraphs in which the speeds of the trolleys differ with regard to each other so that the outermost trolley on the support side will have the lowest speed whereas the outermost trolley on the carriage side will have the highest speed.

It is another object of this invention to provide an arrangement which will practically eliminate any rope slippage and will make a correction of the trolleys necessary only after a very long time of operation whereby a smooth operation and a considerable increase in the speed of the carriage will be made possible.

These and other objects and advantages of the invention will appear more clearly from the following specification in connection with the accompanying drawings in which:

Fig. 1 illustrates a side view of a rope trolley according to the present invention which is provided with pairs of rope drive sheaves.

Fig. 2 is a horizontal section taken along the line II—II of Fig. 1.

Fig. 3 is a vertical section taken along the line III—III of Fig. 1.

Fig. 4 is a side view of a trolley provided with parabolic sheaves, i.e. winch-like sheaves equipped with planetary transmissions.

Fig. 5 represents a vertical section taken along the line V—V of Fig. 4.

Fig. 7 is a vertical section through Fig. 6 taken along the line VII—VII thereof.

General arrangement

Figure 6:
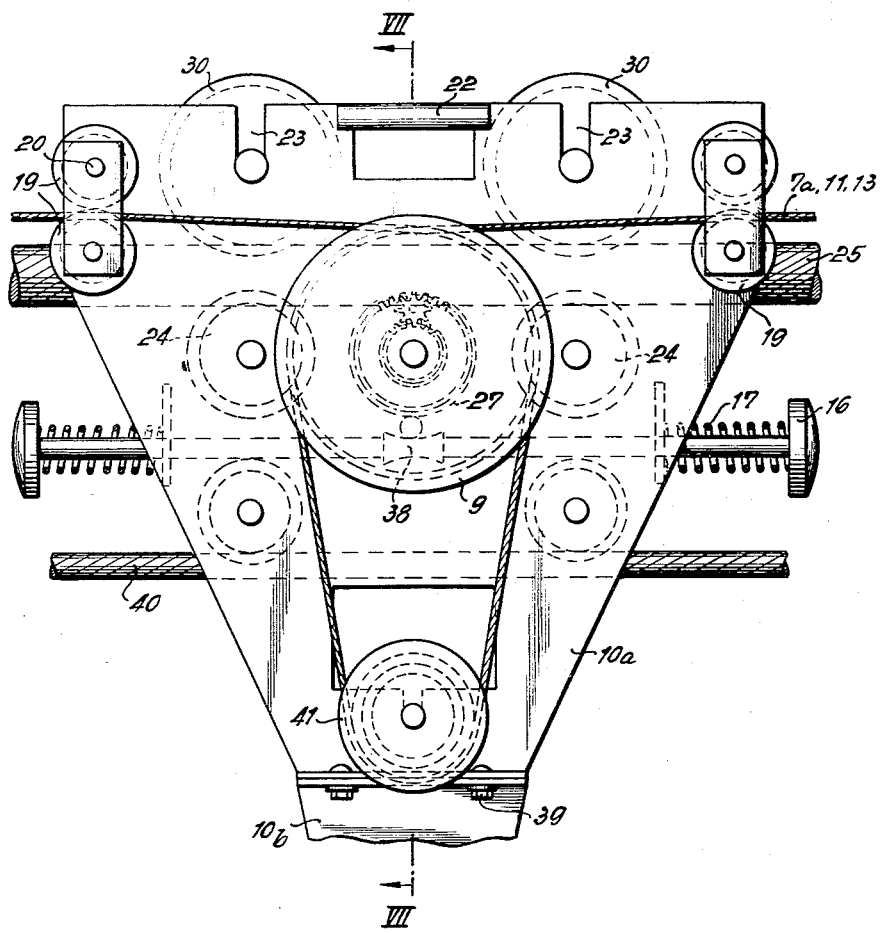
Fig. 6 illustrates a side view of a trolley equipped with multi-groove sheaves.
Figure 8:
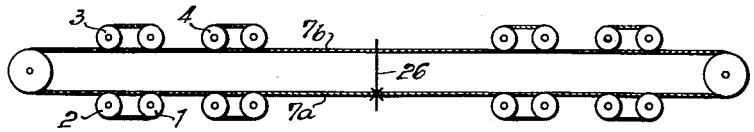
Fig. 8 represents a rope drive system with an endless hauling rope for trolleys with pairs of rope drive sheaves.

According to the present invention, one or more separate trolley ropes are provided for the drive of the trolleys as action and reaction element or elements, which separate trolley rope or ropes are looped around rope driving sheaves. For the sake of simplicity, the trolley track cable will henceforth be called briefly the drive cable. According to the present invention, the rope trolley may be equipped with two rope driving sheaves, especially with two parabolic sheaves, i.e. with winch-like sheaves or with two multi-groove sheaves or the like, which sheaves are rotatably but otherwise stationarily arranged in the rope trolley casing or rope trolley frame. Furthermore the rope trolley according to the present invention may be equipped with two pairs of driving sheaves or the like which are interconnected in a power-locking manner while the individual rope driving sheaves are rotatably but otherwise stationarily arranged in the rope trolley casing or in or on the rope trolley frame. According to the invention, one of the two rope driving sheaves or one of the two pairs of rope driving sheaves may be destined to be looped around by one strand of the hauling rope whereas the other rope drive sheave or pair of rope drive sheaves is destined to be looped by the other strand of the hauling rope, i.e. rope trolley drive rope, so that the hauling rope will simultaneously be action and reaction element.

According to a further development of the invention, each of the two rope drive sheaves or each of the two pairs of rope drive sheaves is intended to be looped by an endless hauling rope which can circulate, while each of the two rope drive sheaves or each of the two pairs of rope drive sheaves is looped around by an endless hauling rope of its own so that one endless hauling rope acts as action element and the other endless hauling rope acts as reaction element.

Furthermore according to the present invention, of the two rope drive sheaves or of the two pairs of rope drive sheaves one rope drive sheave or one pair of rope drive sheaves is looped around by one endless hauling rope and the other rope drive sheave or the other pair of rope drive sheaves is looped by a fixedly arranged hauling rope so that the endless hauling rope acts as action element and the fixedly arranged hauling rope acts as reaction element. One rope drive sheave or one pair of rope drive sheaves may be coupled with the other rope drive sheave or the other pair of rope drive sheaves by a disengageable clutch in such a manner that when the clutch is made effective, one rope drive sheave or one pair of rope drive sheaves conveys its movement to the other rope drive sheave or other pair of rope drive sheaves and vice versa.

The two rope drive sheaves and the clutch as well as the transmission for conveying the rotation of the rope drive sheaves may be arranged on one shaft, and the transmission may be designed as rotary or planetary gear transmission especially as practically encased transmissions. The rope trolley is preferably equipped with one or two buffers which when being pressed back against the thrust of a spring or the like will in their turn disengage the clutch between the rope drive sheaves or pairs of rope drive sheaves, which clutch is moved into its effective position when being subjected to the pressure or the pull of a spring. The disengageable clutch is again made effective by means of a spring or the like when the pressure upon the buffers subsides and when said buffers due to the effect of a spring or the like return to their original or starting position.

The casing or the frame of the rope trolley is provided with guiding rollers for the hauling rope or ropes. Furthermore, the casing or frame of the rope trolley may be provided with oppositely arranged bores into which the bolts or shafts of the guiding rollers may be exchangeably inserted. The rope trolley casing or the rope trolley frame may be equipped with ears for suspension and with a handle.

The bolts or shafts of the rotatable parts for instance of the running rollers, guiding rollers or the like may be journalled in open longitudinal slots so that the rotatable parts together with their bolts or shafts can be lifted out of their bearings. The present invention also suggests to provide the casing or supporting frame of rope trolleys as multi-part casing or frame and to interconnect the individual parts in a disengageable manner. Above all the upper portion of the rope trolley casing or of the rope trolley frame with the hauling rope should preferably be so designed that it can be used in connection with any cable crane or the like and can be connected with a lower portion which as to its specific design is adapted to the requirements of the respective cable crane.

According to the invention, the rope trolley may be provided with counter rollers which will considerably contribute to maintaining the position of the rope trolley in a desired manner in upright position with regard to the track cable and the driving direction and which will particularly contribute to maintaining the horizontal main shaft of the rope trolley in driving direction parallel to the track cable. The invention embraces not only the rope trolleys described herein but also covers cableways, cable cranes or the like provided with rope trolleys according to the invention.

The movement of the endless hauling rope or endless hauling ropes for driving the rope trolleys may according to the present invention be effected by separate rope drives. If desired the hauling rope or ropes may have their ends connected to the carriage. whereby they will become endless and will be moved by the carriage.

*Structural arrangement*

Referring now to the drawings in detail, the rope trolley illustrated in Figs. 1 to 3 movably rests on a track cable 25 by means of its rollers 30. The ends of track cable 25 are, as customary, anchored on two members which may be stationary or may be movable. In the rope trolley casing 10a below the track cable 25 are arranged the shafts of the rope drive sheaves 1, 2, 3 and 4 as well as the shafts of the transmission 31, 32, 33, 34, 35, and 36. The pairs of rope drive sheaves 1, 2 and 3, 4 are arranged for positive connection with each other by means of the gears 31, 32 and 33 and the gears 34, 35 and 36 respectively. The gears 32 and 35 are disengageably interconnected through the disengageable clutch 15. The disengagement of the clutch 15 is effected by the buffers 16 (Fig. 1). When the buffers 16 are displaced in longitudinal direction thereof, especially by a collision of two trolleys, the coupling lever 37 (Fig. 3) is actuated by the control cam 38 which is fixedly connected to the buffer rods (Fig. 1), as a result of which the clutch is disengaged or made ineffective. Consequently the positive connection between the driving or hauling rope strands 7a, 7b and 11, 12 and 13, 14 respectively is interrupted so that the rope trolley can be displaced. The rope trolley hauling or drive cable is reeved around the rope drive sheaves 1, 2 and 3, 4 and is guided between the rollers 19 when entering into or leaving the rope trolley casing 10a. The disengageable clutch with the displaceable buffers may, if desired, also be replaced by a sliding clutch.

The hauling or driving cable 7a, 11, 13, and 7b, 12, 14 serve for driving the trolley; the ends of said driving cable may be connected to the carriage so that the movement of the carriage brings about movement of the trolley as shown in Figs. 8 to 11. According to Figs. 12 and 13, the action or pulling cable 13 has both of its ends connected to the carriage, whereas the pulled or reaction cable 14 has its ends connected to the anchoring points of the cableway.

Figure 11:
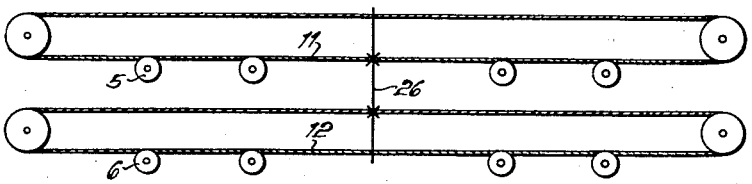
Fig. 11 represents a rope drive system with two endless hauling ropes for rope trolleys with two rope drive sheaves.
Figure 12:
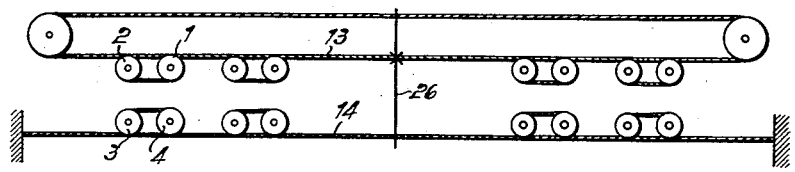
Fig. 12 is a rope drive system with an endless hauling rope and a fixedly clamped rope for rope trolleys with pairs of rope drive sheaves.
Figure 13:
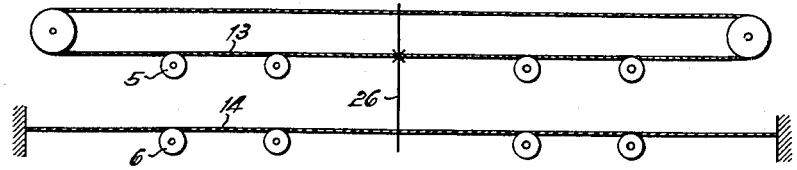
Fig. 13 is a rope drive system with an endless driving rope and a fixedly clamped rope for rope trolleys with rope drive sheaves.

As illustrated in Figs. 8 to 13, the rope trolley hauling cable 7a, 7b may be designed as an endless cable (Figs. 8 and 9) or the trolley hauling cable, may consist of a plurality of endless cables 11, 12 (Figs. 10 and 11) or may consist of one endless cable 11 and one non-endless cable 14 (Figs. 12 and 13). The movement of individual or all of said ropes or cables is brought about by the carriage 26 as will be clear from Figs. 8 to 13. However, the cables may also be moved by separate drives. With the rope system shown in Fig. 12, only one rope, namely rope 13, is driven by the carriage 26, whereas the rope 14 is fixedly clamped or held at its ends.

The rope trolleys for the various rope systems differ from each other merely by the transmission ratios of the gears.

The rope trolley casing according to the present invention comprises two main sections 10a and 10b which are interconnected for instance by means of screws 39. The rope trolley can thus be shipped with a considerable saving in freight costs and above all can in this way be employed for any cable crane type because its upper section 10a can be assembled and connected to the respective required lower section which can be adapted to the individual cable crane type involved. The reference numeral 40 in Fig. 1 designates a hauling rope for moving the carriage. The rope trolley may of course also be used in connection with such cable tramways in which the track cable 40 is arranged differently for instance is guided in the lower main section 10b of the rope trolley.

The rope trolley may be provided with open cut-outs 23 so as to allow an insertion and removal of the rollers and their shafts into and from said cut-outs or bearings.

The rope trolley may also be provided with handles 22 (Fig. 1) or with suspension ears 21. The rope trolleys illustrated in Figs. 4, 5, 6 and 7 are similar in construction to the rope trolleys of Figs. 1 to 3 and, therefore, corresponding elements have been provided with the same reference numerals. The rope trolley of Figs. 4, 5, 6 and 7 differs from that of Figs. 1 to 3 primarily in that it is not equipped with pairs of rope drive sheaves but instead is provided with single rope drive sheaves. These single rope drive sheaves are with the arrangement of Figs. 4 and 5 designed as parabolic sheaves, i.e. winchlike sheaves and are designated with the reference numerals 5 and 6. The trolley rope track cable 7a, 7b and 11, 12, and 13, 14 respectively may be looped once or a plurality of times around the winch-like sheaves 5, 6.

According to the invention, the transmission between the two winch-like sheaves 5 and 6 may be designed as rotary or planetary gear transmission 27. In this connection (for the sake of simplicity not shown in Fig. 5) one rotary transmission may be arranged on each side of the trolley in order to obtain the necessary transmission ratio. According to the invention, it is highly advantageous to arrange the drive sheaves 5, 6 and the rotary or planetary gear transmission 27 as well as the clutch 15 on an axle or shaft 28 common to them and possibly to encase the transmission completely and in an oil-tight manner.

The rope trolley illustrated in Figs. 6 and 7 is very similar to the trolley shown in Figs. 4 and 5. However, instead of the parabolic sheaves, i.e. winch-like sheaves 5, 6, the rope trolley of Figs. 6 and 7 is provided with a plurality of sheaves 8, 9. Below the multi-groove sheaves 8, 9 there are arranged two multi-groove counter rollers 41 which may also be designed as a plurality of one-groove sheaves. The rope trolley track cable 7a, 7b and 11, 12, and 13, 14, respectively is in a continuous manner looped around both the plural groove sheaves 8 and 9 and the counter rollers 41.

Figure 9:
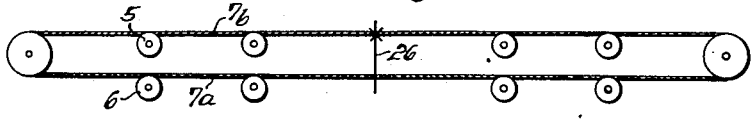
Fig. 9 is a rope drive system with an endless hauling rope for rope trolleys with two rope drive sheaves.
Figure 10:
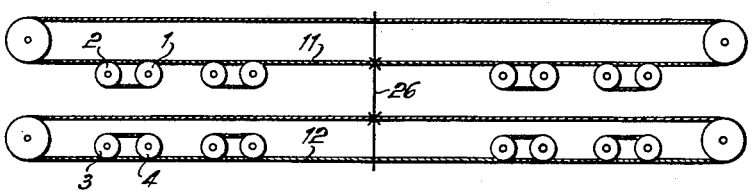
Fig. 10 is a rope drive system with two endless hauling ropes for rope trolleys with pairs of rope drive sheaves.

The rope systems for the rope trolleys of Figs. 4 and 5 are principally the same as those for the rope trolleys according to Figs. 1, 2 and 3 and are illustrated in Figs. 9, 11 and 13.

According to the invention it is suggested to equip the rope trolleys with counter rollers 24 which are arranged below the track cable 25. In this way the track cable 25 is guided between the rollers 30 and the counter rollers 24 whereby the horizontal axis of the trolley is maintained parallel to the track cable axis.

It is, of course, understood that the present invention is, by no means, limited to the particular constructions and systems shown in the drawings but also comprises any modifications within the scope of the appended claims.

What I claim is:

1. In a rope trolley system for cableways, cable cranes, and the like: a plurality of rope trolleys, transmission means respectively arranged for driving connection with said trolleys for varying the speed thereof, and at least one hauling rope positively drivingly interconnecting said rope trolleys.

2. In a rope trolley system for cableways, cable cranes, and the like: a plurality of rope trolleys, each of said rope trolleys having drivingly connected thereto at least two rope drive sheaves, transmission means respectively arranged for driving connection with said trolleys for varying the speed thereof, and hauling rope means looped around said sheaves for driving the latter.

3. A rope trolley according to claim 2, in which each of said trolleys has drivingly connected thereto two pairs of rope drive sheaves.

4. In a rope trolley system for cableways, cable cranes, and the like: a plurality of rope trolleys, each of said rope trolleys having drivingly connected thereto at least two rope drive sheaves, transmission means respectively arranged for driving connection with said trolleys for varying the speed thereof, and endless hauling rope means looped around said sheaves so that one strand of said hauling rope means conveys the action forces upon said sheaves and the other strand of said hauling rope means conveys the reaction forces upon said sheaves.

5. In a rope trolley system for cableways, cable cranes, and the like: a plurality of rope trolleys, each of said rope trolleys having drivingly connected thereto at least two rope drive sheaves, transmission means respectively arranged for driving connection with said trolleys for varying the speed thereof, and a pair of hauling rope means respectively looped around said drive sheaves so that one endless hauling rope means conveys action forces to said sheaves and the other endless hauling rope means conveys reaction forces upon said sheaves.

6. In a rope trolley system for cableways, cable cranes, and the like: a plurality of rope trolleys, each of said rope trolleys having drivingly connected thereto at least two rope drive sheaves, transmission means respectively arranged for driving connection with said trolleys for varying the speed thereof, and a pair of hauling rope means, one of said hauling rope means being an endless cable looped around one of said sheaves and the other hauling rope means being fixedly arranged and being looped around another sheave, the arrangement being such that the endless rope means conveys action forces upon said sheaves whereas the fixedly arranged hauling rope means conveys reaction forces upon said sheaves.

7. In a rope trolley system for cableways, cable cranes, and the like: a plurality of rope trolleys, each of said rope trolleys having drivingly connected thereto at least two rope drive sheaves, hauling rope means looped around said sheaves for driving the latter, and disengageable clutch means for selectively effecting or interrupting driving connection between at least two rope drive sheaves, the arrangement being such that when the clutch is made effective, movement is conveyed from one rope drive sheave to the other and vice versa.

8. In a rope trolley system for cableways, cable cranes, and the like: a plurality of rope trolleys, each of said rope trolleys having drivingly connected thereto at least two rope drive sheaves, hauling rope means looped around said sheaves for driving the latter, disengageable clutch means for selectively effecting or interrupting driving connection between at least two rope drive sheaves, and planetary gear transmission means respectively arranged for driving connection with the sheaves of said trolleys, the shaft of each planetary gear transmission means pertaining to one and the same trolley and also the shaft of the sheaves and the clutch means of one and the same trolley being co-axially arranged with regard to each other.

9. In a rope trolley system for cableways, cable cranes, and the like: a plurality of rope trolleys, each of said rope trolleys having drivingly connected thereto at least two rope drive sheaves and including transmission means drivingly connected thereto, spring urged clutch means respectively associated with the sheaves of said trolleys, and buffer means respectively associated with each trolley and operatively connected with said sheaves, said buffer means being operable to bring about movement of said clutch means into its ineffective position for interrupting driving connection between the sheaves of one and the same trolley.

10. A trolley system according to claim 9, in which said buffer means is arranged in response to pressure acting thereupon to bring about movement of the respective clutch means pertaining thereto into its ineffective position, spring means being associated with each of said clutch means and being operable in response to a relief of pressure on said clutch means to bring about movement of the latter into its effective coupling position.

11. In a rope trolley system for cableways, cable cranes, and the like: a plurality of rope trolleys, each of said rope trolleys having associated therewith at least two rope drive sheaves, transmission means arranged for driving connection with said trolleys for varying the speed thereof, hauling rope means looped around said sheaves for driving the latter, frame means respectively associated with said trolleys for supporting the same, and guiding rollers mounted in said frame means for guiding said hauling rope means.

12. A trolley system according to claim 11, in which said frame means is provided with oppositely located bores, shaft means being associated with said guiding rollers and being exchangeably mounted in said bores.

13. A trolley system according to claim 11, which includes means connected to said frame means for lifting and carrying said trolleys.

14. A rope trolley for cableways, cable means, and the like, which comprises in combination: a pair of frame means provided with vertically extending cutouts open at the upper end, a plurality of rollers arranged to roll on a track cable, at least two rope drive sheaves carried by said frame means, and transmission means arranged for driving connection with said sheaves, said rollers being provided with shafts detachably mounted in said cutouts.

15. A rope trolley according to claim 14, in which said frame means is composed of a plurality of detachably interconnected elements.

16. A rope trolley according to claim 14, in which said frame means includes an upper section adapted to be connected with sections of different trolley design to thereby allow employment of said upper section for any cable crane type.

17. In a rope trolley system for cableways, cable cranes, and the like: a plurality of rope trolleys, transmission means respectively arranged for driving connection with said trolleys for varying the speed thereof, at least one hauling rope positively drivingly interconnecting said rope trolleys, and counter rollers associated with said trolleys and respectively arranged to maintain the position of the rope trolley with regard to the track cable and with regard to the driving direction and also adapted to maintain the horizontal main shaft of the trolleys in driving direction parallel to the track cable.

18. In a rope trolley system for cableways, cable cranes, and the like: a plurality of rope trolleys, each of said rope trolleys having drivingly connected thereto at least two rope drive sheaves, transmission means arranged for driving connection with said trolleys for varying the speed thereof, a carriage, and hauling rope means looped around said sheaves for driving the latter, the ends of said hauling rope means being fastened to said carriage to thereby make said hauling rope means endless and making said carriage the driving element proper of said trolleys.

19. In a rope trolley system for cableways, cable cranes, and the like: a plurality of rope trolleys, each of said rope trolleys having drivingly connected thereto at least two rope drive sheaves, transmission means arranged for driving connection with said trolleys for varying the speed thereof, endless hauling rope means looped around said sheaves for driving the latter and driving means drivingly connected with said endless hauling rope means to thereby form the driving element proper for said trolleys.

No references cited.